(12) United States Patent
Ganoza et al.

(10) Patent No.: US 6,622,941 B2
(45) Date of Patent: Sep. 23, 2003

(54) METHOD AND APPARATUS FOR CLEANING JET PUMP NOZZLES

(75) Inventors: Winston F. Ganoza, Hollister, CA (US); Robert W. Whitling, Morgan Hill, CA (US); Jared A. Lathrop, Palo Alto, CA (US)

(73) Assignee: General Electric Company, Schenectady, NY (US)

( * ) Notice: Subject to any disclaimer, the term of this patent is extended or adjusted under 35 U.S.C. 154(b) by 60 days.

(21) Appl. No.: 09/683,019

(22) Filed: Nov. 8, 2001

(65) Prior Publication Data

US 2003/0085301 A1 May 8, 2003

(51) Int. Cl.$^7$ ................................................ B05B 3/06
(52) U.S. Cl. ........................ 239/251; 239/104; 239/261; 239/531; 239/532; 239/DIG. 13; 134/167 R
(58) Field of Search ........................ 239/104, 225.1, 239/251, 261, 124, 525, 531, 532, 280, 281, DIG. 13; 134/88, 166 R, 167 R, 167 C, 169 C, 166 C, 179

(56) References Cited

U.S. PATENT DOCUMENTS

| | | | | |
|---|---|---|---|---|
| 3,300,388 A | * | 1/1967 | Jerman et al. | 239/536 |
| 4,043,397 A | * | 8/1977 | Glowienke | 239/532 |
| 4,303,348 A | * | 12/1981 | O'Brien | 239/532 |
| 4,700,662 A | * | 10/1987 | Fasnacht et al. | 239/557 |
| 4,905,900 A | * | 3/1990 | Scharton et al. | 239/99 |
| 5,361,286 A | | 11/1994 | Monserud et al. | |
| 5,390,853 A | * | 2/1995 | Ellul | 239/532 |
| 5,418,824 A | | 5/1995 | Monserud et al. | |
| 5,782,255 A | * | 7/1998 | Magnin et al. | 134/167 R |
| 6,035,940 A | * | 3/2000 | Bourke | 239/532 |
| 6,105,593 A | * | 8/2000 | MacLaren et al. | 134/167 R |

* cited by examiner

Primary Examiner—Steven J. Ganey
(74) Attorney, Agent, or Firm—Armstrong Teasdale LLP

(57) ABSTRACT

A cleaning device for a jet pump nozzle in a nuclear reactor. The cleaning device includes a tubing section having a first end, a second end and a mid-section between the first end and the second end, a pole adapter coupled to the tubing section at the mid-section, and a hydrolaze head assembly coupled to the first end.

16 Claims, 5 Drawing Sheets

METHOD AND APPARATUS FOR CLEANING JET PUMP NOZZLES

BACKGROUND OF INVENTION

This invention relates generally to nuclear reactors and more particularly, to methods and apparatus for cleaning jet pump nozzles in a nuclear reactor.

A reactor pressure vessel (RPV) of a boiling water reactor (BWR) typically has a generally cylindrical shape and is closed at both ends by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus located between the cylindrical reactor pressure vessel and the cylindrically shaped shroud.

In a BWR, hollow tubular jet pumps positioned within the shroud annulus provide the required reactor core water flow. An inlet mixer, an upper portion of each jet pump, is laterally positioned and supported against two opposing rigid contacts within restrainer brackets by a gravity actuated wedge. The inlet mixers are each held in place at the top end by a preloaded beam. A jet pump diffuser, the lower portion of each jet pump, discharges water from the inlet mixer into the lower core plenum to maintain adequate water flow.

At least some known inlet mixers include a pre-nozzle section; a plurality of nozzles circumferentially distributed about an inlet mixer axis and a plurality of inlet vents. Each nozzle includes an inner surface and an outlet. The inlet vents are circumferentially distributed about the inlet mixer axis adjacent the nozzle outlets. As jets of water exit the nozzles water from the annulus is drawn into the inlet mixer via the inlet vents, where it is mixed with water from recirculation pumps.

During reactor operation, a scale forms on inner surfaces of the jet pump nozzle. This scale buildup is a significant problem because it causes a loss of cooling flow and reduces reactor output, which increase costs. Further, maintenance in the annular volume between the core shroud and the reactor pressure vessel, in which the inlet mixers are located, is difficult because of limited access and radiation levels.

SUMMARY OF INVENTION

In one aspect, a cleaning device is provided for a jet pump nozzle in a nuclear reactor. The cleaning device includes a tubing section including a first end, a second end and a mid-section between the first end and the second end. A pole adapter is coupled to the tubing section at the mid-section, and a hydrolaze head assembly is coupled to the tubing first end.

In another aspect, a cleaning assembly is provided for a jet pump nozzle in a nuclear reactor. The cleaning assembly includes a high-pressure pump, a high-pressure hose coupled to the high-pressure pump, a fluid control valve configured to regulate fluid flow through the high-pressure-hose, a handling pole, and a cleaning device coupled to the high-pressure hose downstream of the fluid control valve. The cleaning device includes a tubing section, a pole adapter, and a hydrolaze head assembly. The tubing section includes a first end, a second end and a mid-section between the first end and the second end, with second end coupled to the high-pressure hose. The pole adapter is coupled to the tubing section at the mid-section and is configured to releasably attach to the handling pole. The hydrolaze head assembly is coupled to the tubing section first end.

In another aspect, a method for cleaning scale from a jet pump nozzle in a reactor pressure vessel, utilizing a cleaning assembly is provided. The cleaning assembly includes a handling pole connected to a cleaning device that includes a hydrolaze head assembly having a rotating sleeve. The method includes positioning the hydrolaze head assembly in the reactor pressure vessel, providing high-pressure fluid to the cleaning device, positioning the hydrolaze head assembly within the jet pump nozzle, expelling high pressure fluid from the hydrolaze head assembly to remove scale from the jet pump nozzle, and repositioning the hydrolaze head assembly vertically in the jet pump nozzle.

DETAILED DESCRIPTION

Figure 1:
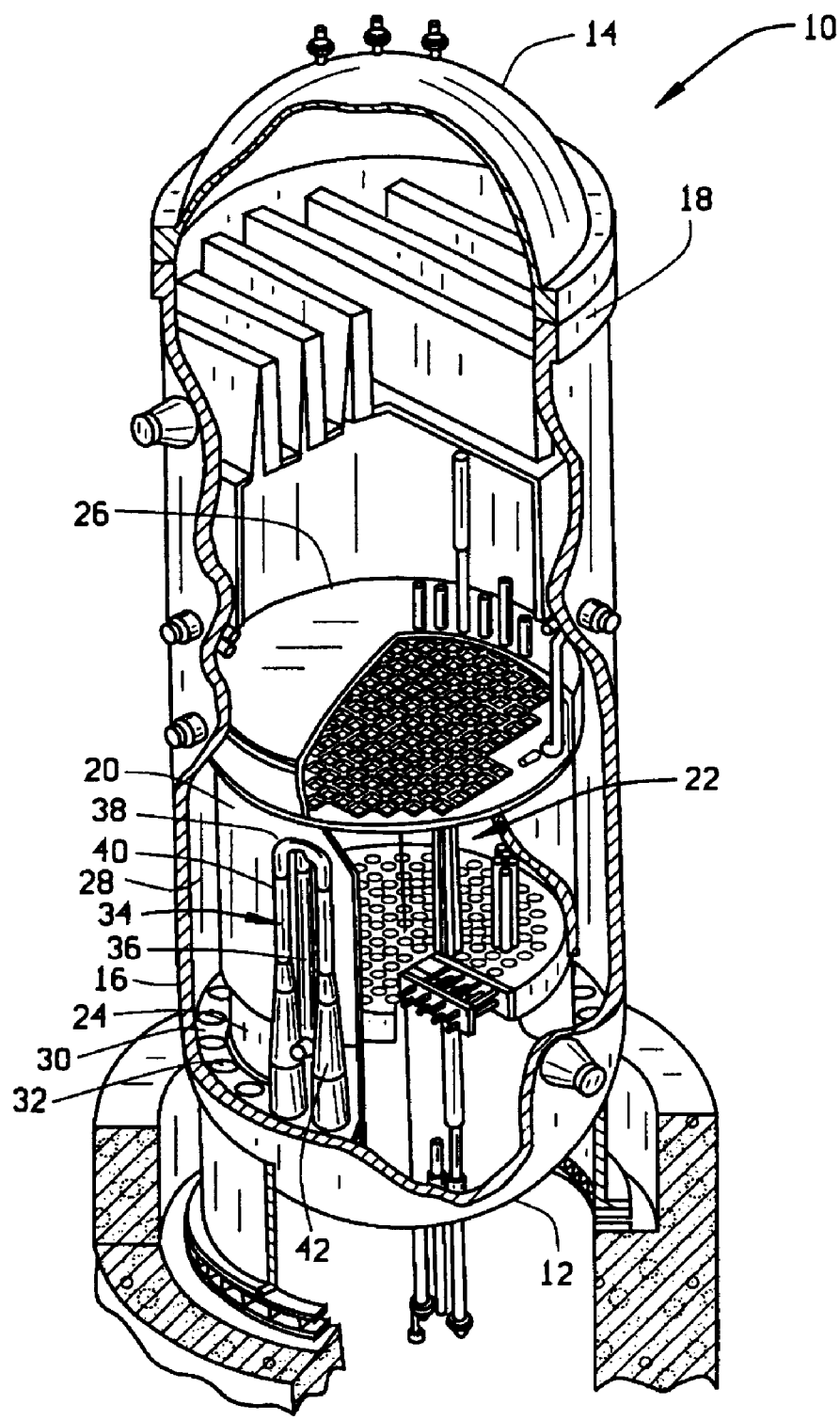
FIG. 1 is a cutaway side view of a boiling water nuclear reactor pressure vessel.

FIG. 1 is a cutaway side view of a boiling water nuclear reactor pressure vessel (RPV) 10. RPV 10 has a generally cylindrical shape and is closed at one end by a bottom head 12 and at its other end by a removable top head 14. A side wall 16 extends from bottom head 12 to top head 14. Side wall 16 includes a top flange 18. Top head 14 is attached to top flange 18. A cylindrically shaped core shroud 20 surrounds a reactor core 22. Shroud 20 is supported at one end by a shroud support 24 and includes a removable shroud head 26 at the other end. An annulus 28 is formed between shroud 20 and side wall 16. A pump deck 30, which has a ring shape, extends between shroud support 24 and RPV side wall 16. Pump deck 30 includes a plurality of circular openings 32, with each opening housing a jet pump 34. Jet pumps 34 are circumferentially distributed around core shroud 20. An inlet riser pipe 36 is coupled to two jet pumps 34 by a transition assembly 38. Each jet pump 34 includes an inlet mixer 40, and a diffuser 42.

Figure 2:
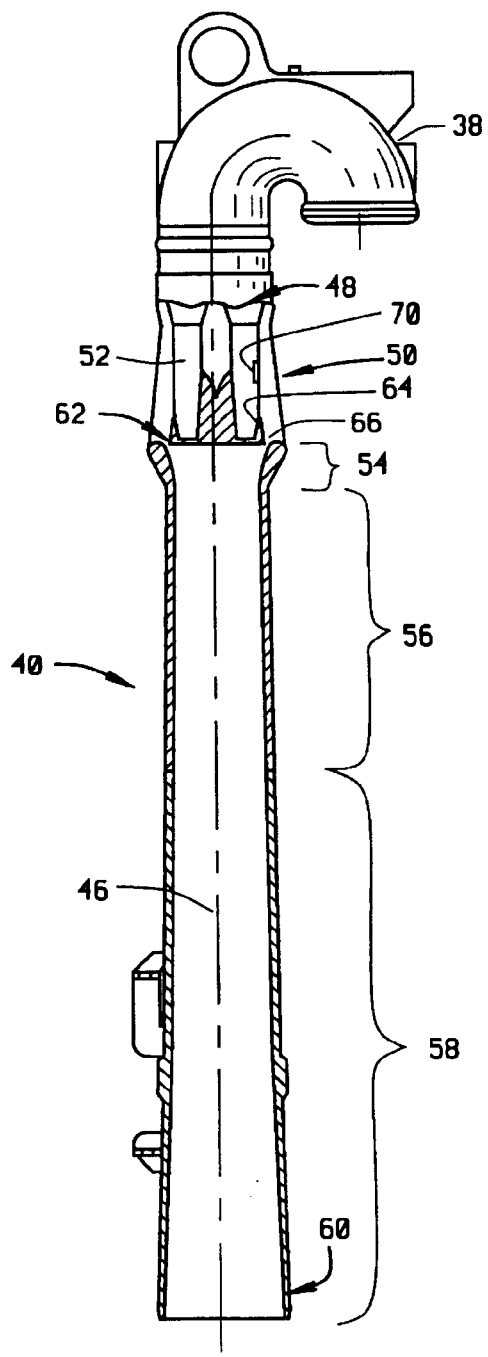
FIG. 2 is a cutaway side view of an inlet mixer shown in FIG. 1.

FIG. 2 is a cutaway side view of inlet mixer 40. Inlet mixer 40 includes an inlet mixer axis 46, a pre-nozzle section 48; a nozzle section 50 that including a plurality of nozzles 52 circumferentially distributed about inlet mixer axis 46; a throat section 54; a barrel section 56; a flare section 58; and a slip joint 60. In the exemplary embodiment, nozzles 52 are circumferentially distributed at equal angles about inlet mixer axis 46. Each nozzle 52 includes a nozzle outlet 62 and a nozzle inner surface 64. Nozzle inner surface 64 is tapered at nozzle outlet 62, so that nozzle 52 has a plurality of internal diameters. During jet pump 34 operation, undesirable scale 70 builds up on nozzle inner surfaces 64.

Figure 3:
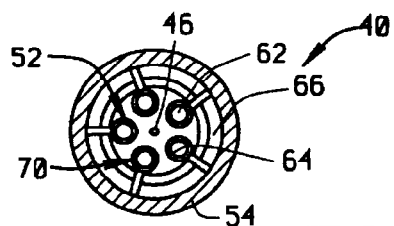
FIG. 3 is a cross-sectional view of the inlet mixer shown in FIG. 2.
Figure 4:
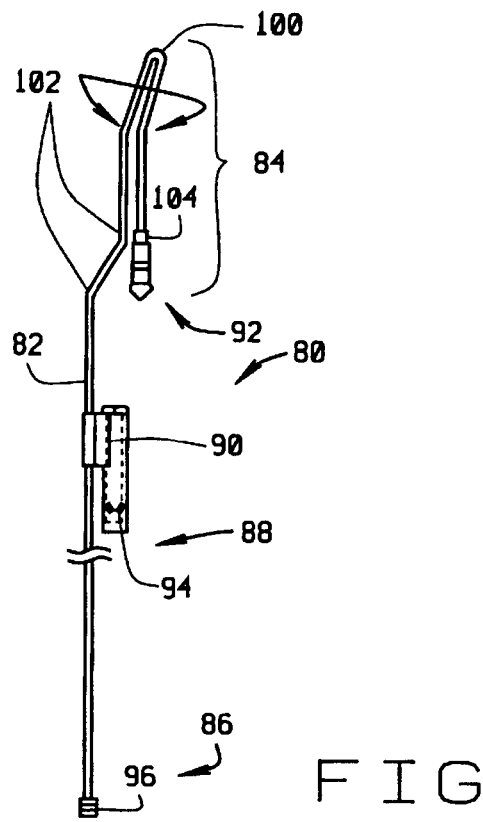
FIG. 4 is a side view of a cleaning device.

FIG. 3 is a cross-sectional view of inlet mixer 40. Referring to FIGS. 3 and 4, inlet mixer 40 also includes inlet vents 66 circumferentially distributed about inlet mixer axis 46 and situated radially adjacent nozzle outlets 62. In the exemplary embodiment, five inlet vents 66 are circumferentially distributed at equal intervals about inlet mixer axis 46. During scheduled maintenance periods, with RPV head 14 (shown in FIG. 1) and other components removed, inlet vents 66 can be accessed from a maintenance platform or bridge (not shown). Scale 70 builds up on nozzle inner surfaces 64.

Figure 5:
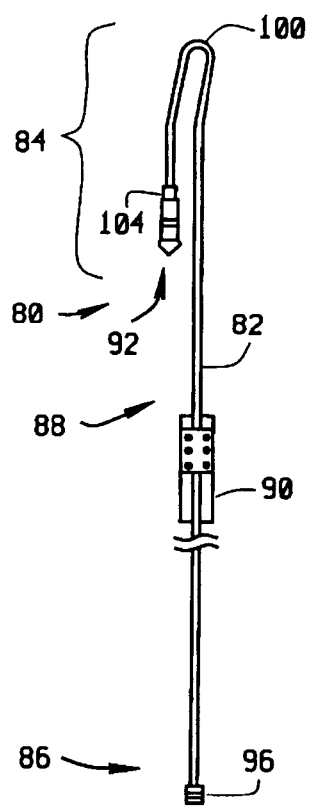
FIG. 5 is a top view of the cleaning device shown in FIG. 4.
Figure 6:
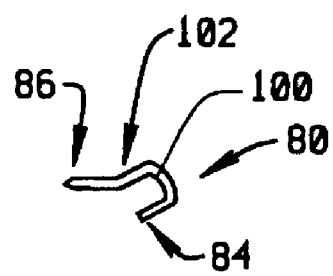
FIG. 6 is an end view of the cleaning device shown in FIG. 4, with parts removed for clarity.

FIG. 4 is a side view and FIG. 5 is a top view of a cleaning device 80 for cleaning scale from jet pump nozzles 52. FIG. 6 is an end view of cleaning device 80, with parts removed for clarity. Referring to FIGS. 4, 5 and 6, cleaning device 80 includes a tubing section 82 with a first end 84, a second end 86 and a mid-section 88 between first end 84 and second end 8. Cleaning device 80 also includes a pole adapter 90 coupled to tubing section 82 at mid-section 88 and a hydrolaze head assembly 92 coupled to first end 84.

Tubing section 82 is a rigid high-pressure conduit for cleaning fluid. More specifically, tubing section 82 is designed to safely contain and conduct purified water at a working pressure of at least 15,000 pounds per square inch (psi) (1050 kilogram-force per square centimeter ($kgf/cm^2$)) pressure. In another embodiment, tubing section 82 is designed for a lower fluid working pressure. Tubing section 82 is sized to facilitate insertion of first end 84 with hydrolaze head assembly 92 into vent inlet 66. In the exemplary embodiment, tubing section 82 has about a 0.375 inch (about 0.96 centimeter) outer diameter which facilitates a water flow rate of up to about about 18 gallons per minutes (gpm) (70 liters per minute), and is constructed from Type 304 stainless steel. In other embodiments, tubing section 82 includes a larger or smaller outer diameter and is constructed from other suitable materials.

Pole adapter 90 is rigidly coupled to tubing section 82 at mid-section 88 to facilitate removable attachment of handling tools. In one embodiment, pole adapter 90 is clamped around tubing section 82 and includes a pair of internal latches 94. Tubing section second end 86 includes a second end coupling 96. In one embodiment, second end coupling 96 is threaded and welded to tubing section 82. In another embodiment, second end coupling 96 is formed directly on tubing section first end 84.

Tubing section first end 84 includes a generally semi-circular bend 100, defining a generally U-shaped first end 84. First end 84 includes a plurality of bends 102 in addition to semi-circular bend 100 to form a non-planar, skewed U-shaped first end 84. In another embodiment, first end 84 has a planar U-shape.

First end 84 is removably coupled to hydrolaze head assembly 92 by a first end coupling 104. In one embodiment, first end coupling 104 is threaded and welded to tubing section 82. In another embodiment, first end coupling 104 is formed on tubing section first end 84.

Figure 7:
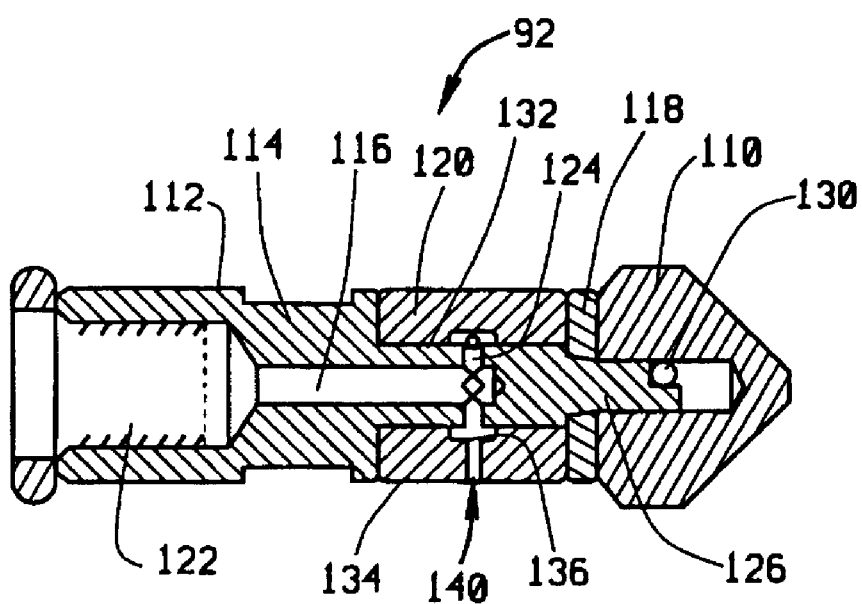
FIG. 7 is a cross-section view of a hydrolaze head assembly shown in FIG. 4.

FIG. 7 is a cross-section view of hydrolaze head assembly 92. Hydrolaze head assembly 92 includes a nose 110, a connector 112 coupled to tubing section first end 84, a body 114 extending from connector 112, a center bore 116 extending into body 114, a washer 118, and a sleeve 120 between nose 110 and connector 112. Connector 112 includes a passage 122 for fluidly connecting tubing section 82 to center bore 116. Connector 112 is threaded to receive tubing section first coupling 104. In alternative embodiments, other known methods of coupling are used, including for example, a bayonet coupling or welding.

Body 114 extends from connector 112 and contains center bore 116, which is in fluid communication with tubing section 82 through first end coupling 104. Center bore 116 is fluidly connected to a plurality of ring ports 124 in body 114. Ring ports 124 fluidly couple center bore 116 to couple sleeve 120. In the exemplary embodiment, four ring ports (three are shown) extend perpendicularly from center bore 116.

Body 114 also includes a shaft 126, which receives washer 118 and couples to nose 110. Washer 118 and nose 110 retain sleeve 120 rotationally coupled to body 114. More specifically, washer 118 abuts sleeve 120 and is secured by nose 110, which is coupled to body 114. In another embodiment, sleeve 120 abuts directly against nose 110. In the exemplary embodiment, nose 110 is pinned to shaft 126 by pin 130. In alternative embodiments, other known methods of attaching nose 110 to shaft 126 are used, including for example, a threaded coupling or welding.

Sleeve 120 is substantially cylindrical and includes an inner surface 132, an outer surface 134 and an inner ring channel 136 connected to at least one sleeve port 140. Sleeve ports 140 extend radially through sleeve 120 from inner ring channel 132 to outer surface 134. Sleeve ports 140 are tangential to outer surface 134. High-pressure fluid exiting sleeve ports 140 cause sleeve 120 to rotate around body 114.

Figure 8:
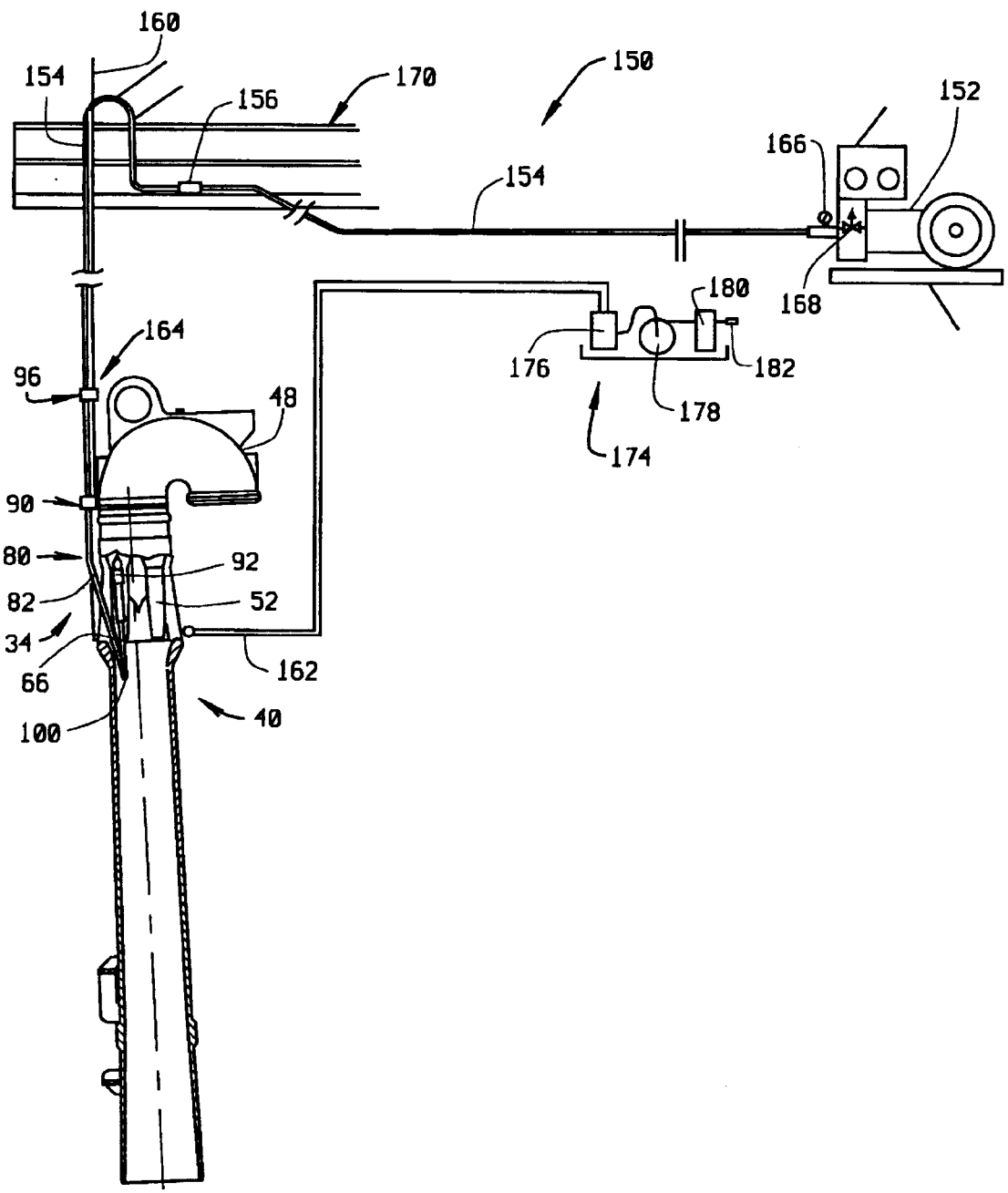
FIG. 8 is a schematic representation of a cleaning assembly, including the cleaning device shown in FIG. 4.

FIG. 8 is a schematic representation of a cleaning assembly 150, including cleaning device 80. Cleaning assembly 150 includes a high-pressure pump 152, a high-pressure hose 154 coupled to high-pressure pump 152, and a fluid control valve 156 configured to control fluid flow through high-pressure-hose 154. Cleaning assembly 150 also includes a handling pole 160 and cleaning device 80 coupled to high-pressure hose 154 downstream of fluid control valve 156. In one embodiment, cleaning assembly 150 also includes a suction hose 162.

High-pressure pump 152 receives electrical power and cleaning fluid from other plant maintenance systems (not shown). In the exemplary embodiment, the cleaning fluid is purified water meeting the required cleanliness standards for reactor maintenance. High-pressure pump 152 also receives cooling water (not shown) with a separate discharge path. High-pressure pump 152 provides cleaning water at about 8,000 psi to about 15,000 psi (550 $kgf/cm^2$ to 1050 $kgf/cm^2$) pressure. High-pressure pump 152 includes a discharge pressure gage 166 for measuring cleaning water pressure and a throttle valve 168 to control discharge pressure. In the exemplary embodiment, high-pressure pump 152 is configured to provide up to about 15 gpm (60 liter per minute). In other embodiments, high-pressure pump 152 includes a larger or smaller fluid volume capacity.

High-pressure pump 152 discharges high-pressure water to high-pressure hose 154. High-pressure hose 154 includes a hose connector 164 configured to mate to tubing section second end coupling 96. High-pressure hose 154 is configured to supply high-pressure cleaning water at 8,000 psi to 15,000 psi (550 $kgf/cm^2$ to 1050 $kgf/cm^2$) pressure from high-pressure pump 152 to cleaning device 80. High-pressure hose 154 connects high-pressure pump 152 to tubing section second end coupling 96 through fluid control valve 156. Cleaning device 80 is downstream of fluid control valve 156. Fluid control valve 156 provides for control of high-pressure water on or adjacent a maintenance bridge 170 for operator access. In the exemplary embodiment fluid control valve 156 is a foot operated valve.

Handling pole 160 is releasably attached to pole adapter 90 and extends from adjacent jet pump nozzles 52 to maintenance bridge 170, positioned above RPV 10 during maintenance periods.

Suction hose 162 is a low-pressure hose positioned adjacent jet pump inlet vents 66. Suction hose 162 is connected to a maintenance a scale collection system 174, which filters, collects, and retains scale 70 removed by cleaning assembly 150. Scale 70 is radioactive and requires special handling. Scale collection system 174 includes suction hose 162, a settling tank 176, a collection pump 178, a filter canister 180, and an outlet line 182. Water containing scale 70 is suctioned from adjacent jet pump nozzles 52 via suction hose 162 to settling tank 176. Water from settling tank 176 is pumped through filter canister 180 to remove additional scale 70. Filtered water is sent to a site treatment system (not shown) for additional processing.

In use, manual operation of cleaning assembly 150 by trained operators facilitates scale 70 removal from jet pump nozzles 52 in reactor pressure vessel 10. During a shutdown maintenance period with RPV top head 14 and other components removed, and RPV 10 filled with water, cleaning assembly 150 is positioned at the maintenance site. Handling pole 160 is attached to pole adapter 90 to position and control cleaning device 80. Throughout the cleaning, operators manually control cleaning device 80 by manipulation of handling pole 160. Suction hose 16 is positioned adjacent jet pump nozzles 50 and scale collection system 174 is placed in operation.

Hydrolaze head assembly 92 is positioned underwater in the RPV 10. Head assembly 92 is underwater to prevent excessive spray of cleaning water. High-pressure pump 152 is operated to provide high-pressure water at between about 8,000 psi (550 kgf/cm$^2$) to about 15,000 psi (1050 kgf/cm$^2$) pressure to fluid control valve 156. High-pressure pump 152 discharge pressure is controlled by pump capacity and operation of high-pressure pump throttle valve 168. In the exemplary embodiment, high-pressure pump 152 provides high-pressure cleaning water at about 13,500 psi (950 kgf/cm$^2$) pressure. Fluid control valve 156 is operated to supply high-pressure water to cleaning device 80 and the operator verifies that hydrolaze head sleeve 120 is rotating. The operator manipulates handling pole 162, positioning cleaning device first end 84 within jet pump nozzle section 50. More specifically, the operator positions hydrolaze head assembly 92 within jet pump nozzle 52 by inserting cleaning device first end 84, including hydrolaze head assembly 92 through inlet vents 66, then rotating and raising cleaning device 84 using handling pole 160. Typically, a remote video camera (not shown) is used to facilitate this operation and verify positioning of hydrolaze head assembly 92.

The operator operates fluid control valve 156 to provide high-pressure water to cleaning device 80. Rotating sleeve 120 ejects the high-pressure water through sleeve ports 140 to remove scale 70 from jet pump nozzle inner surface 64. Rotating sleeve 120 provides circumferencial cleaning of the varied diameter inner surface 64. High-pressure water ejected from sleeve ports 140 impinges on jet pump nozzle inner surfaces 64 to remove scale 70. While supplying high-pressure water to cleaning device 80, the operator repositions hydrolaze head assembly 92 vertically in jet pump nozzle 52. More specifically, the operator repositions hydrolaze head assembly 92 by manually raising and lowering cleaning device 80 with the handling pole 160. The operator vertically manipulates handling pole 160 to cause hydrolaze head assembly 92 to travel adjacent the desired portion of jet pump nozzle inner surface 64. In the exemplary embodiment, the operator vertically raises hydrolaze head assembly 92 about 8 to 9 inches of travel within jet pump nozzle 52 and then lowers hydrolaze head assembly 92 about the same distance of travel, providing scale 70 removal in the selected portion of jet pump nozzle 52. Markings (not shown) on handling pole 160 facilitate the measurement of cleaning device 80 vertical travel.

The operator repeatedly raises and lowers hydrolaze head assembly 92, using handling pole 160, for a time period sufficient to remove at least a portion of scale 70 from jet pump nozzle inner surface 64. In one embodiment, the operator repeatedly raises and lowers hydrolaze head assembly 92, using handling pole 160, for about five minutes to about ten minutes to remove scale 70. More specifically, the operator repeatedly raises and lowers hydrolaze head assembly 92 for a time period that varies substantially linearly with the pressure of the high-pressure water from high-pressure pump 152. The time period is about five minutes when the high-pressure water is provided at about 15,000 psi (1050 kgf/cm$^2$) pressure. The time period is about ten minutes when the high pressure water is provided at about 8,000 psi (550 kgf/cm$^2$) pressure. Scale 70 is removed at intermediate high-pressure water pressures when the operator repeatedly raises and lowers hydrolaze head assembly 92 for a time period that varies substantially linearly with the water pressure. When the operator has completed the cleaning of one jet pump nozzle based on the high-pressure water pressure and the time period, the operator positions hydrolaze head assembly 92 in another jet pump nozzle using the above method.

Cleaning device 80 facilitates scale 70 removal from jet pump nozzles 52 in reactor pressure vessel 10. Cleaning device 80 includes a reduced number of components, facilitating a reduction in contaminated material. Furthermore, cleaning assembly 150 can reduce maintenance time, as compared to other cleaning systems, with an overall reduction in maintenance cost and reduced outage time.

While the invention has been described in terms of various specific embodiments, those skilled in the art will recognize that the invention can be practiced with modification within the spirit and scope of the claims.

What is claimed is:

1. A cleaning device for a jet pump nozzle in a nuclear reactor, said cleaning device comprising:
    a tubing section comprising first end, a second end and a mid-section between said first end and said second end;
    a pole adapter coupled to said tubing section mid-section; and
    a hydrolaze head assembly coupled to said tubing section first end, said hydrolaze head assembly comprising a body in fluid communication with said tubing section, and a sleeve extending circumferentially around at least a portion of said body, said sleeve rotatable around said body, said sleeve comprising at least one sleeve port in fluid communication with said tubing section.

2. A cleaning device in accordance with claim 1 wherein said tubing section first end comprises a generally semi-circular bend.

3. A cleaning device in accordance with claim 2 wherein said tubing section first end comprises a plurality of bends to form a generally skewed U-shaped first end.

4. A cleaning apparatus in accordance with claim 1 wherein said tubing section comprises a high pressure tubing section.

5. A cleaning device in accordance with claim 1 wherein said hydrolaze head assembly further comprising a nose coupled to a first end of said body, a connector located at a second end of said body and coupled to said tubing section first end, and a center bore extending from said connector at least partially through said body, said center bore in fluid communication with said tubing section.

6. A cleaning device in accordance with claim 5 wherein said sleeve is positioned between said nose and said connector.

7. A cleaning device in accordance with claim 6 wherein said body comprises at least one ring port in fluid communication with said center bore and said at least one sleeve port.

8. A cleaning device in accordance with claim 7 wherein said sleeve is rotated around said body by fluid passing from said center bore through said sleeve port.

9. A cleaning assembly for a jet pump nozzle in a nuclear reactor, said cleaning assembly comprising:

a high-pressure pump;

a high-pressure hose coupled to said high-pressure pump;

a fluid control valve configured to regulate fluid flow through said high-pressure-hose;

a handling pole; and a cleaning device coupled to said high-pressure hose downstream of said fluid control valve, said cleaning device comprising:
  a tubing section having a first end, a second end and a mid-section between said first end and said second end, said second end coupled to said high-pressure hose;
  a pole adapter coupled to said tubing section tubing section mid-section and releasably attachable to said handling pole; and
  a hydrolaze head assembly coupled to said tubing section first end.

10. A cleaning assembly in accordance with claim 9 wherein said tubing section first end comprises a semi-circular bend.

11. A handling assembly in accordance with claim 9 wherein said tubing section comprises a high pressure tubing section.

12. A cleaning assembly in accordance with claim 9 wherein said hydrolaze head assembly further comprises a nose, a body, a connector coupled to said tubing section first end, and a center bore in fluid communication with said tubing section.

13. A cleaning assembly in accordance with claim 12 wherein said hydrolaze head assembly further comprises a sleeve between said nose and said connector, said sleeve rotatable around said body.

14. A cleaning assembly in accordance with claim 13 wherein said sleeve comprises at least one sleeve port in fluid communication with said center bore.

15. A cleaning assembly in accordance with claim 14 wherein said sleeve is rotated around said body by fluid passing from said center bore through said sleeve port.

16. A cleaning assembly in accordance with claim 9 wherein said high-pressure pump provides fluid at between about 8,000 psi (550 kgf/cm$^2$) pressure to about 15,000 psi (1050 kgf/cm$^2$) pressure.

* * * * *

UNITED STATES PATENT AND TRADEMARK OFFICE
CERTIFICATE OF CORRECTION

PATENT NO.     : 6,622,941 B2                                                            Page 1 of 1
DATED          : September 23, 2003
INVENTOR(S)    : Winston F. Ganoza et al.

It is certified that error appears in the above-identified patent and that said Letters Patent is hereby corrected as shown below:

Column 7,
Line 26, delete "tubing section tubing section mid-section" insert therefor -- tubing section mid-section --.

Signed and Sealed this

Second Day of December, 2003

JAMES E. ROGAN
*Director of the United States Patent and Trademark Office*